United States Patent [19]

Loth

[11] 4,105,363
[45] Aug. 8, 1978

[54] OVERSPEED CONTROL ARRANGEMENT FOR VERTICAL AXIS WIND TURBINES

[76] Inventor: John Lodewyk Loth, P.O. Box 4094, Morgantown, W. Va. 26505

[21] Appl. No.: 696,116

[22] Filed: Jun. 14, 1976

[51] Int. Cl.² ............................ F03D 3/06; F03D 7/06
[52] U.S. Cl. .......................................... 416/41; 416/23; 416/111; 416/139; 416/140
[58] Field of Search .................... 416/18, 139, 41, 23, 416/111, 117, 119, 118, 140

[56] References Cited

U.S. PATENT DOCUMENTS

| 325,025 | 8/1885 | Tefft | 416/139 X |
| 419,024 | 1/1890 | Straw | 416/117 X |
| 988,098 | 3/1911 | Hoffer | 416/118 |
| 2,106,557 | 1/1938 | Putnam | 416/41 X |

FOREIGN PATENT DOCUMENTS

| 40,341 | 6/1932 | France | 416/117 |
| 735,111 | 8/1955 | United Kingdom | 416/41 |

Primary Examiner—Everette A. Powell, Jr.
Attorney, Agent, or Firm—Schuyler, Birch, Swindler, McKie & Beckett

[57] ABSTRACT

This invention is an overspeed control arrangement for vertical axis wind turbines employing normally vertically positioned rotor blades, said control arrangement allows the rotor blades to tilt either forward or backwards to form a swept wing configuration, at wind turbine speeds beyond the design rpm. When the rotor blade is in a highly swept wing configuration its high drag and low lift reduces the turbine rotor torque to zero and eliminates excessive overspeeding and structural damage. The rotor blade can tilt about a radial or nearly so, tilt-support arm, mounted on a concentric bearing, the tilting starts at the feathering design rpm which is controlled by the geometric position of the combined center of gravity of both rotor blade and tilt-support arm. The control arrangement is automatic and passive and does not require the use of springs, pulleys or levers.

14 Claims, 2 Drawing Figures

OVERSPEED CONTROL ARRANGEMENT FOR VERTICAL AXIS WIND TURBINES

BACKGROUND OF THE INVENTION

This invention relates generally to vertical axis wind turbines which employ vertically positioned airfoils as rotor blades. The centrifugal force acting on each blade in generally exceeds many times its weight, their ratio is often referred to as "g" loading. The efficiency of the vertical axis wind turbine depends on its tip speed to wind speed ratio here referred to as TR. For high efficiency this tip speed ratio TR ranges from 3 to 6 depending on the wind tubine geometry. The corresponding "g" loading acting at the center of gravity depends on the radial distance R and the wind speed $V_\infty$ and is given by $$\text{"g" loading} = \frac{(V_\infty \cdot TR)^2}{R \cdot g_c} \quad [1]$$

where $g_c$ is the acceleration of gravity.

For example, a wind turbine with $TR = 3$ at design wind speed $V_\infty = 20$ km per hour will have a "g" loading of $$\frac{93}{R \text{ in meter}}$$

Thus even large radius rotors have a high "g" loading. To protect the structural integrity of the wind turbine it is essential that over speeding in high winds has to be prevented. Several techniques have been employed, such as (a) increasing the shaft load as a function of rotor rpm (b) control the angle of attack of the rotor blade airfoil and thus the lift and torque produced (c) allow the rotor blades to fold outwards, this is called "coning" and acts much like a sailboat which leans over on its side in a strong wind so as to reduce the effective area of its sails. This coning motion occurs in the direction of the centrifugal force, and because of the high "g" loading on the rotor blade it requires strong springs, levers or pulleys to balance the centrifugal force.

SUMMARY OF THE INVENTION

The new method claimed here allows the rotor blade to tilt either forward or backward, as selected, about a radial or nearly radial tilt-support arm. The rotor blade then forms a highly swept airfoil with associated increase in drag and reduction in lift and torque produced. The arrangement is such that only a preselected small component of the centrifugal force is used to provide a tilting moment on the rotor blade. This tilting moment is in the same order of magnitude as that resulting from the weight of the rotor blade with its center of gravity located aft of the tiltsupport arm center line. Thus no springs, pulleys or levers are required to provide a balancing moment. Through the use of a tilt stop, the rotor blade is preloaded with a tilting moment due to its own weight. At all speeds, at or below the design feathering rpm, the rotor blade will remain vertically, leaning against the tilt stop. At all speeds higher than the design feathering rpm the tilting moment created by a component of the centrifugal force will cause the rotor blade to be tilted such that it is in balance with the moment due to its weight. The maximum tilt or rotor blade sweep angle is obtained when the rotor torque produced equals that of the load applied, the corresponding sweep angle is usually less than fifty degrees. The rpm at which the airfoil starts to tilt and at which it reaches the maximum tilt angle is at the choice of the designer by using the proper combination of four critical variables in the configuration of the wind turbine. The variables involved and their corresponding relation are described next.

DETAILED DESCRIPTION OF PREFERRED EMBODIMENT

Figure 1:
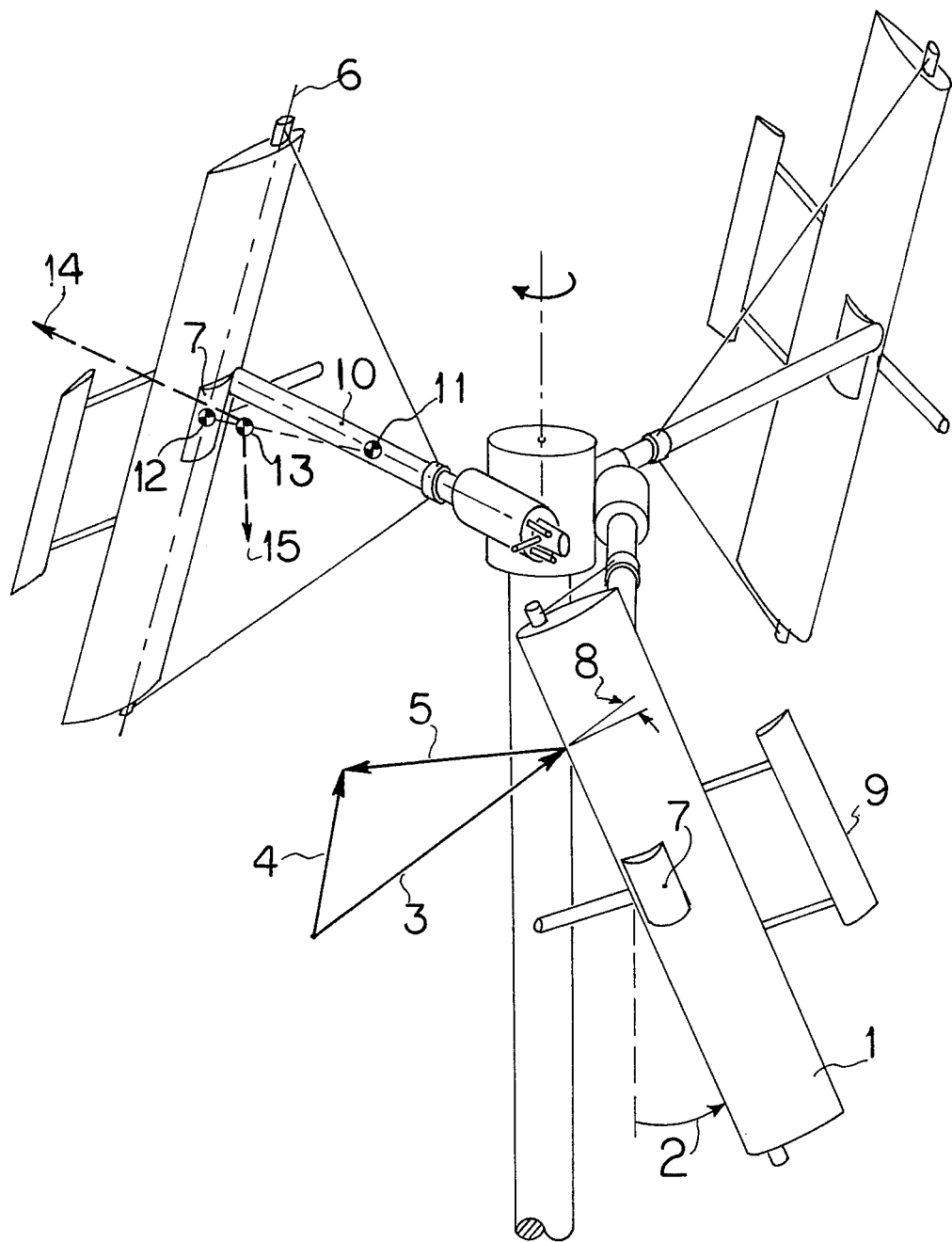
FIG. 1 shows a perspective view of a vertical axis wind tubine of the present invention having three rotor blades or airfoils operating above feathering design rotor rpm.

FIG. 1 is a typical vertical axis wind turbine employing three rotor blades 1. These rotor blades operate in a vertical position at all rotor speeds below the design feathering rpm. FIG. 1 shows the rotor operating above the design feathering rpm, with the rotor blades tilted forward to a swept position with tilt angle $\theta$ as indicated by 2. The aerodynamic lift and thus rotor torque produced reduce with increased sweep angle $\theta$. Each rotor blade experiences a relative wind velocity 3 which is the vector sum of the wind velocity 4 and the blade angular velocity 5. Each rotor blade is allowed to pivot about its spar center line 6 through the use of conical roller bearings in bearing housing 7. Each rotor blade is maintained oriented with an angle of attack 8 to the relative wind 3 through the use of a stabilator type tail surface 9. The components of the lift and drag forces on each blade in the direction of rotation provide the required rotor torque.

This invention relates only to the passive rotor overspeed control by allowing the blades to tilt to form a highly swept wing configuration. Although either forward or aft tilt can be employed, in FIG. 1 is shown the arrangement for forward tilt through the use of a tilt-support arm 10. The center of gravity of the rotor blade tilt-support arm 11 is located halfway on the tilt-support arm. The center of gravity of the rotor blade 12 is located in the middle of the spar center line 6 and below and aft of the tilt arm centerline. The combined center of gravity 13 of rotor blade and tilt arm together is located on a straight line connecting 11 and 12. The forces acting on this combined center of gravity 13 are the centrifugal force 14 and the combined weight 15. A very small component of the centrifugal force 14 exerts a forward tilting moment on the rotor blade, and a very large component of the weight 15 exerts a backward tilting moment on the rotor blade. Above design feathering rpm, as is shown in FIG. 1, the rotor blade attains a sweep angle $\theta$, indicated by 2 such that the forward tilting moment due to the component of 14 balances the backward tilting moment due to 15. In this forward tilted position the effective rotor blade wing span is reduced and is effective chord is increased resulting in an increase in drag and a decrease in aspect ratio, lift and rotor torque. The equilibrium wind turbine rotor rpm and corresponding rotor blade tilt position is reached when the rotor torque produced equals the applied load torque. The rotor torque produced drops off to zero before reaching a tilt or sweep angle $\theta = 60$ degrees.

Figure 2:
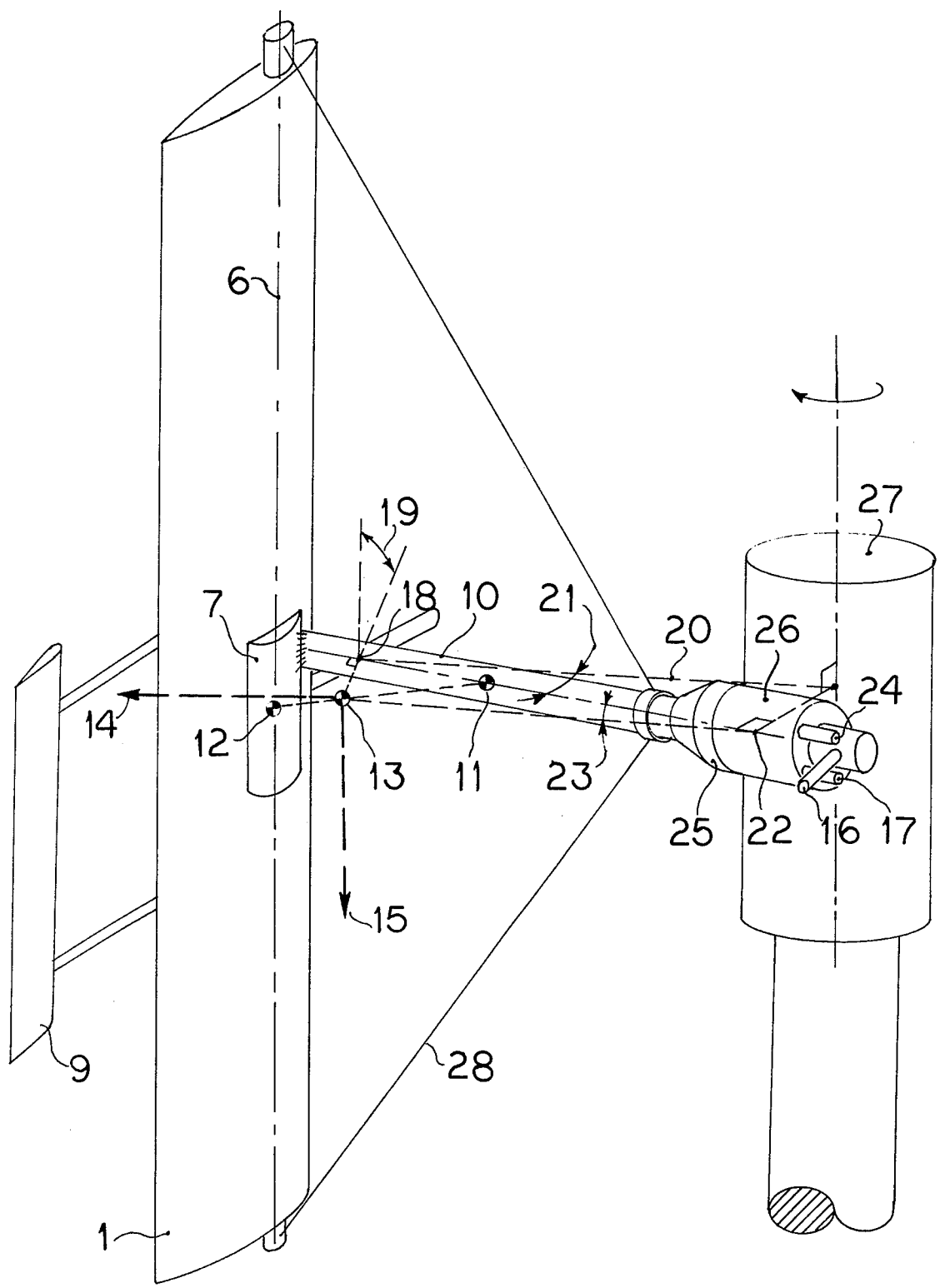
FIG. 2 shows a detailed perspective view of one of the rotor blades or airfoils shown in FIG. 1 operating at or below feathering design rotor rpm.

FIG. 2 is a detail of one of the rotor blades operating at below feathering design rotor rpm, therefore the rotor blade is vertical and angle $\theta$ is zero. FIG. 2 shows the parameters which control the relation between the rotor blade tilt angle $\theta$ and the rotor rpm. The center of gravity of the tilt arm 11 is shown in the middle of the tilt arm, and the rotor blade center of gravity 12 is shown in the middle of rotor blade spar bearing housing 7. The combined center of gravity 13 of rotor blade and tilt arm together is located on a straight line between 11 and 12 and is located behind and below the tilt arm center line. This causes the weight 15 to exert a backward tilting moment on the rotor blade. At rotor speeds below the design feathering rpm this moment is cancelled by the tilt arm pin 16 resting against the tilt stop 17. This stop keeps the rotor blade in a vertical position below design feathering rpm. The projection of the combined center of gravity 13 intersects the tilt arm centerline at point 18. When the rotor blade is vertical as shown, this projection makes an angle $\Gamma$ indicated by 19 with the vertical. In a tilted rotor blade position this projection makes an angle $\Gamma + \theta$ with the vertical. The radial distance from the rotor center line to intersection 18 is called the radius R, indicated by 20. The tilt arm advances in the direction of rotation for a forward tilting wing and opposite for a backward tilting wing. The angle the radius R makes with the tilt arm center line is $\phi$ as indicated by 21. The projection of the rotor center line intersects the tilt arm center line at point 22. The angle the tilt arm center line makes with the connection between 22 and 13 is called $\delta$ as indicated by 23. The above defined four parameters: $\Gamma = (19)$, $R = (20)$, $\phi = (21)$, $\delta = (23)$ control the relation between the wing tilt angle $\theta = 2$ and the rotor rpm above design feathering rpm as given by Eq.[2]:

rotor rpm above design feathering rpm = [2]

$$\frac{30}{\pi} \left[ \frac{g_c}{R \cos(\Gamma + \theta) \left\{ \frac{\sin\phi}{\sin(\Gamma + \theta)} + \tan\delta \cos\phi \right\}} \right]^{\frac{1}{2}}$$

The design feathering rpm is found by setting $\theta = 0$ in Eq. [2] and this results in Eq. [3]

rotor design feathering rpm = [3]

$$\frac{30}{\pi} \left[ \frac{g_c}{R \cos\Gamma \left\{ \frac{\sin\phi}{\sin\Gamma} + \tan\delta \cos\phi \right\}} \right]^{\frac{1}{2}}$$

Because the centrifugal force 14 acting on the combined center of gravity 13 can be many times greater than the combined rotor blade and tilt arm weight 15, only a small component of this force 14 must be employed to generate a tilting moment. Therefore the angles $\phi = 21$ and $\delta = 23$ must be very small and generally less than two degrees. The maximum control sensitivity is obtained when the tilt arm advance angle $\phi = 21$ is reduced to zero or one employs radial tilt arms. The relation between tilt angle $\theta$ and rpm is then simplified as shown in Eq. [4]

rotor rpm above design feathering rpm = [4]

$$\frac{30}{\pi} \left[ \frac{g_c}{R \cos(\Gamma + \theta) \tan\delta} \right]^{\frac{1}{2}}$$

The maximum allowable forward tilt angle $\theta$ can be limited by using a tilt stop 24 and the tilt motion can be damped by employing a rubber sleeve 25 attached to both the tilt-support arm and its bearing housing 26. The tilt-support arm bearing housing 26 is welded to the vertical rotor shaft bearing housing 27.

The outboard portion of the tilt arm should be aerodynamically clean for low drag and the large diameter tilt arm bearing housing 26 is best located close to the vertical rotor shaft for maximum drag reduction. This also allows the use of guy wires 28 to reduce the bending moments in the rotor blade. The guy wires run from the root of the tilt-support arm to outboard points on the rotor blade spar.

I claim:

1. In a vertical axis wind turbine having a shaft mounted along the vertical axis of said wind tubine, a rotor mounted on said shaft for rotating said shaft about the vertical axis of said wind turbine comprising:

support arm means;

mounting means for mounting said support arm means on said shaft of said wind turbine along a generally radial axis extending therefrom, said mounting means enabling said support arm means to rotate about its radial axis a predetermined amount; and rotor blade means formed by an air foil mounted on said support arm means in a position normal to said support arm means for rotation about the vertical axis of said wind turbine in response to the interaction between the wind and said rotor blade means, said rotor blade means being generally parallel to the vertical axis of said wind turbine during normal operating speeds but, upon reaching a predetermined operating speed exceeding the normal operating speed, tilting about the radial axis of said support arm means in a swept wing configuration in response to a small component of centrifugal force acting on said rotor blade means to thereby control the operating speed of said rotor.

2. In a vertical axis wind turbine according to claim 1 wherein said rotor blade means tilts in the direction of rotation of said rotor, said rotor further comprising tilt stop means for preventing said rotor blade means from tilting in the direction opposite to the direction of rotation of said rotor.

3. In a vertical axis wind turbine according to claim 1 wherein said rotor blade means tilts in the direction opposite to the direction of rotation of said rotor, said rotor further comprising tilt stop means for preventing said rotor blade means from tilting in the direction of rotation of said rotor.

4. In a vertical axis wind turbine according to claim 1 wherein said rotor comprises a plurality of said rotor blade means and said support arm means.

5. In a vertical axis wind turbine according to claim 1 wherein said mounting means comprises:

a rotor housing for mounting said support arm means on said shaft of said wind turbine; and bearing means connected to said rotor housing to support said support arm means for enabling said support arm means to rotate about its radial axis a predetermined amount.

6. In the vertical axis wind turbine according to claim 5 wherein the center of gravity of the combination of said rotor blade means and said support arm means is located aft and below said radial axis to cause said rotor blade means to tilt forward at a predetermined speed of rotation of said rotor, said rotor further comprising tilt stop means connected to said support arm means for preventing said rotor blade means from tilting backwards at rotor speeds below said predetermined speed of rotation of said rotor.

7. In the vertical axis wind turbine according to claim 5 wherein the center of gravity of the combination of said rotor blade means and said support arm means is located in front of and below said radial axis to cause said rotor blade means to tilt backward at a predetermined speed of rotation of said rotor, said rotor further comprising tilt stop means connected to said support arm means for preventing said rotor blade means from tilting forward at rotor speeds below said predetermined speed of rotation of said rotor.

8. In a vertical axis wind turbine according to claim 5 wherein said rotor blade means includes a rotor blade spar extending slightly beyond both ends of said rotor blade means and said rotor blade means further comprises guy wires connected between both ends of said rotor blade spar and said support arm means for reducing the bending moments in said rotor blade means.

9. In a vertical axis wind turbine according to claim 5 wherein said rotor further comprises a rubber sleeve covering said support arm means and said bearing means to provide a tilt restraining force in said rotor blade.

10. In a vertical axis wind turbine according to claim 1 wherein the center of gravity of the combination of said rotor blade means and said support arm means is eccentric relative to said radial axis to control the tilting of said rotor blade means about said radial axis and to determine the speed of rotation of said rotor at which said rotor blade means tilts.

11. In a vertical axis wind turbine according to claim 10 wherein the center gravity of the combination of said rotor blade means and said support arm means is located aft and below said radial axis to cause said rotor blade means to tilt forward at a predetermined speed of rotation of said rotor and, in addition, to determine the maximum forward tilt of said rotor blade means.

12. In a vertical axis wind turbine according to claim 11 wherein said support arm means is mounted on said shaft of said wind turbine along an axis which forms a small angle in the direction of rotation of said rotor blade means relative to a radial intersecting said vertical axis.

13. In a vertical axis wind turbine according to claim 10 wherein the center gravity of the combination of said rotor blade means and said support arm means is located in front of and below said radial axis to cause said rotor blade means to tilt backward at said predetermined speed of rotation of said rotor and, in addition, to determine the maximum backward tilt of said rotor blade means.

14. In a vertical axis wind turbine according to claim 13 wherein said support arm means is mounted on said shaft of said wind turbine along an axis which forms a small angle in the direction opposite to the direction of rotation of said rotor blade means relative to a radial intersecting said vertical axis.

* * * * *